(12) United States Patent
Arold

(10) Patent No.: US 6,994,157 B1
(45) Date of Patent: Feb. 7, 2006

(54) AIR CONDITIONER

(75) Inventor: Klaus Arold, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/244,114

(22) Filed: Feb. 4, 1999

(30) Foreign Application Priority Data

Feb. 4, 1998 (DE) .............................. 198 04 287

(51) Int. Cl.
*B60H 1/00* (2006.01)
*B60H 3/00* (2006.01)
*F24F 13/02* (2006.01)
*F25B 29/00* (2006.01)

(52) U.S. Cl. ..................... 165/203; 165/42; 165/43; 454/156; 454/160; 454/161; 237/12.3 A; 237/12.3 B

(58) Field of Classification Search ............... 165/203, 165/42, 43; 454/156, 160, 161; 237/12.3 A, 237/12.3 B
See application file for complete search history.

(56) References Cited

U.S. PATENT DOCUMENTS

| | | | | |
|---|---|---|---|---|
| 3,881,546 A | * | 5/1975 | Otsuka et al. ................ | 165/42 |
| 4,482,009 A | | 11/1984 | Nishimura et al. | |
| 4,537,245 A | * | 8/1985 | Nishimura et al. ........... | 165/43 |
| 5,042,566 A | * | 8/1991 | Hildebrand ................... | 165/43 |
| 5,086,628 A | * | 2/1992 | Hashimoto .................... | 165/42 |
| 5,101,883 A | * | 4/1992 | Kinmartin et al. ............ | 165/43 |
| 5,181,553 A | | 1/1993 | Doi | |
| 5,186,237 A | * | 2/1993 | Adasek et al. ................ | 165/43 |
| 5,862,677 A | * | 1/1999 | Kim et al. .................... | 165/42 |
| 5,878,806 A | * | 3/1999 | Denk et al. ................... | 165/42 |
| 6,206,092 B1 | * | 3/2001 | Beck et al. ................... | 165/43 |

FOREIGN PATENT DOCUMENTS

| | | | | |
|---|---|---|---|---|
| CH | 0168658 | * | 9/1934 | ................ 165/103 |
| DE | 3514359 | * | 10/1986 | ................ 165/203 |
| DE | 41 19 474 | | 2/1995 | |
| DE | 35 14 359 | | 10/1995 | |
| DE | 197 01 875 | | 12/1997 | |
| DE | 196 46 123 | | 5/1998 | |
| DE | 197 31 908 | | 1/1999 | |
| EP | 0 397 997 | | 11/1990 | |
| EP | 0397997 | | 12/1992 | |
| EP | 0841201 | | 5/1998 | |
| FR | 2 614 244 | | 10/1988 | |
| FR | 2 721 862 | | 1/1996 | |

(Continued)

OTHER PUBLICATIONS

Office Action from the Japanese Patent Office dated Oct. 26, 1999.

*Primary Examiner*—John K. Ford
(74) *Attorney, Agent, or Firm*—Crowell & Moring LLP

(57) ABSTRACT

An air conditioner for an occupant compartment of a vehicle having a forward vehicle space and a rearward vehicle space with right and left seat zones includes an air conditioning box, in which an evaporator and a heat exchanger are arranged, as well as a cold air space situated between the evaporator and the heat exchanger. A warm air space is arranged behind the heat exchanger and air mixing spaces are constructed for supplying the forward vehicle space and the rearward vehicle space with conditioned air. To provide a mutually independent temperature adjustment in the forward vehicle space and the rearward vehicle space, a separate air mixing space is assigned to each seat zone. The four air mixing spaces are connected with the warm and cold air spaces by one warm and one cold air flap respectively.

20 Claims, 2 Drawing Sheets

FOREIGN PATENT DOCUMENTS

| | | | | |
|---|---|---|---|---|
| JP | 58-136813 | | 9/1983 | |
| JP | 59-153614 | * | 9/1984 | ............ 454/156 |
| JP | 0001527 | * | 1/1986 | ............ 165/43 |
| JP | 0247210 | * | 10/1989 | ............ 165/43 |
| JP | 3-57714 | | 3/1991 | |
| JP | 3-231020 | | 10/1991 | |
| JP | 5-58143 | | 3/1993 | |
| JP | 5-58144 | * | 3/1993 | ............ 165/203 |
| JP | 10-138735 | | 5/1998 | |
| JP | 4-115460 | | 4/1999 | |
| WO | 96/29211 | | 9/1996 | |

* cited by examiner

AIR CONDITIONER

This application claims the priority of German patent application No. 198 04 287.6, filed Feb. 4, 1998, the disclosure of which is expressly incorporated by reference herein.

BACKGROUND AND SUMMARY OF THE INVENTION

The present invention relates to an air conditioner for an occupant compartment of a vehicle having a forward vehicle space and a rearward vehicle space with one right seat zone and one left seat zone respectively. The air conditioner includes an air conditioning box, an evaporator arranged in the air conditioning box, and a heat exchanger also arranged in the air conditioning box. A cold air space is situated between the evaporator and the heat exchanger, a warm air space is arranged behind the heat exchanger, and air mixing spaces are controllably connected with the cold and warm air spaces for supplying the forward vehicle space and the rearward vehicle space with conditioned air.

In a known air conditioner of this type, in which an individual temperature adjustment for a forward vehicle space and a rearward vehicle space is possible (European Patent Document EP 0 397 997 B1), the heat exchanger is aligned transversely to the evaporator so that the cold air space adjoining the evaporator outlet surface extends below the heat exchanger and the warm air space is situated above the heat exchanger which has two outlets to one air mixing space, respectively. Each of the outlets is equipped with a swivellable air flap. The air mixing space for the forward vehicle space of the occupant compartment continues directly from the cold air space section bounded by the face of the heat exchanger facing the evaporator and can be alternatively blocked and opened up with respect to the cold or warm air space by the first air flap of the warm air space which constitutes an air mixing flap. With an increasing opening of the warm air space, the cold air space is increasingly closed and vice versa. The second air mixing space for the rearward vehicle space of the occupant compartment, which is constructed on the face of the heat exchanger facing away from the evaporator, can be alternatively blocked and opened up in the same manner with respect to the warm air space and the cold air space by the second warm air flap, which is also constructed as an air mixing flap.

On the face of the heat exchanger facing the evaporator, a swivellable cold air flap is arranged. The cold air flap bounds the cold air space section bounded by the air inlet surface of the heat exchanger with respect to the remaining cold air space bounded by the evaporator. The portion of the cold air flow, determined by the partial opening of this cold air flap, on the one hand, is supplied to the air mixing space for the rearward vehicle space and, on the other hand, is supplied to the air mixing space for the forward vehicle space. Of the cold air portion supplied to the air mixing space for the rearward vehicle space, depending on the position of the air mixing flaps, a more or less large part is guided through the heat exchanger and is available in the warm air space as warm air. The cold air flap is linked, by a rod linkage, to the two mutually coupled air mixing flaps so that a firmly defined functional relationship exists when the flaps are adjusted.

In this conception of an air conditioner, the temperature in the rearward vehicle space of the passenger compartment can be controlled only to a limited extent independently of the adjustment of the temperature in the forward vehicle space. This is because the temperature control in the rearward vehicle space is influenced by the momentary position of the cold air flap which is operated for controlling the temperature in the forward vehicle space. If, for example, the forward vehicle space is maximally heated, and the cold air flap is fully opened up, then the air mixing flap on the air mixing space for the forward vehicle compartment completely closes off the cold air space and completely opens up the warm air space, and the air mixing flap on the air mixing space for the rearward vehicle space completely closes off the warm air space and maximally opens up the cold air space. As a result, only cold air arrives in the rearward vehicle space. If, in contrast, the forward vehicle space is controlled, then various cold air flows arrive in the rearward vehicle space depending on the position of the cold air flap, and the temperature of the rearward vehicle space has to be readjusted continuously. In addition, the cold air flow for the rearward vehicle space gradually heats up on the heat exchanger, through which a continuous flow takes place, so that a cold air supply for the rearward vehicle space is impaired.

It is an object of this invention to provide an air conditioner in which an individual temperature adjustment is possible in the forward vehicle space and the rearward vehicle space of the occupant compartment without any mutual influence or reaction and additionally for the right and left seat zones, respectively.

In the air conditioner of the present invention, this object is achieved, along with others, by the provision of four air mixing spaces so that a separate air mixing space is assigned to each seat zone in the forward vehicle space and the rearward vehicle space and by the provision of a warm air flap and a cold air flap for each air mixing space for controllably connecting the four air mixing spaces to the cold air space and the warm air space.

An air conditioner according to the invention has an advantage in that, as a result of having a separate air mixing space assigned to each seat zone in the forward vehicle structure and the rearward vehicle structure and having a pair of flaps, which consists of a warm air flap and a cold air flap, assigned to each air mixing space while eliminating a double-acting air mixing flap, a completely independent and very sensitive temperature control can be achieved in the four seat zones without any mutual reaction. Simultaneously, the power of the heat exchanger is optimally utilized.

According to an advantageous development, the air flaps pertaining to an air mixing space are mutually restrictedly coupled such that one air flap will maximally open up the inlet of the air mixing space assigned to it when the other air flap completely covers the inlet of the air mixing space assigned to it, and vice versa. As a result, only a single temperature adjuster is required for each seat zone.

According to a preferred development of the invention, air passage surfaces of the evaporator and the heat exchanger bound the cold air space on opposite sides and are mutually aligned approximately in parallel, and the inlets of the air mixing spaces, which can be controlled by the cold air flaps, are arranged in pairs above and below the heat exchanger and are preferably situated in planes which are aligned in parallel or at an acute angle with respect to the air passage surfaces of the heat exchanger. This arrangement achieves a compact construction of the air conditioner and, simultaneously, avoids a constant cold air flow along the heat exchanger which is heated thereby.

According to a further development of the invention, respective air ducts branch off of the air mixing spaces for the forward vehicle space of the occupant compartment; one such air duct leads to the left outlet opening and another leads to the right outlet opening in the leg space in the front, one such air duct leads to the left outlet opening and another leads to the right outlet opening in a center plane in the front of the occupant compartment, and one cold air duct, which can be controlled by a shut-off flap, leads from the cold air space to each of the two air ducts leading to the center plane in the front. In this way, the temperature can, in addition, be lowered in the left and the right center plane of the forward vehicle space of the occupant compartment in a targeted manner with respect to the temperature in the leg space of the forward vehicle space; this is comfortable for the vehicle occupants and improves air-conditioning comfort.

According to yet a further development of the invention, one air duct branches off of each of the air mixing spaces for the rearward vehicle space of the occupant compartment; one such duct leads to the left outlet opening and another such duct leads to the right outlet opening in the center plane in the rear, one such duct leads to the left outlet opening and another such duct leads to the right outlet opening in the leg space in the rear, and one cold air duct, which can be controlled by a shut-off flap, leads from the cold air space to each of the two air ducts leading to the center plane in the rear. Such a construction permits the temperature to also be lowered in the rearward vehicle space of the occupant compartment in the left and the right center plane with respect to the temperature in the leg space; this represents an improvement in air conditioning comfort for the users of the rear seat bench.

According to an additional development of the invention, the air flaps pertaining to air mixing spaces for the rearward vehicle space are coupled with the air flaps pertaining to air mixing spaces for the forward vehicle space. Although this restricts the independent temperature control in the rearward vehicle space to certain limits, it avoids the need for separate adjusting elements for the two seat zones in the rearward vehicle space.

BRIEF DESCRIPTION OF THE DRAWINGS

The invention will now be described in detail with reference to an embodiment which is illustrated in the drawings.

DESCRIPTION OF THE PREFERRED EMBODIMENT

Figure 1:
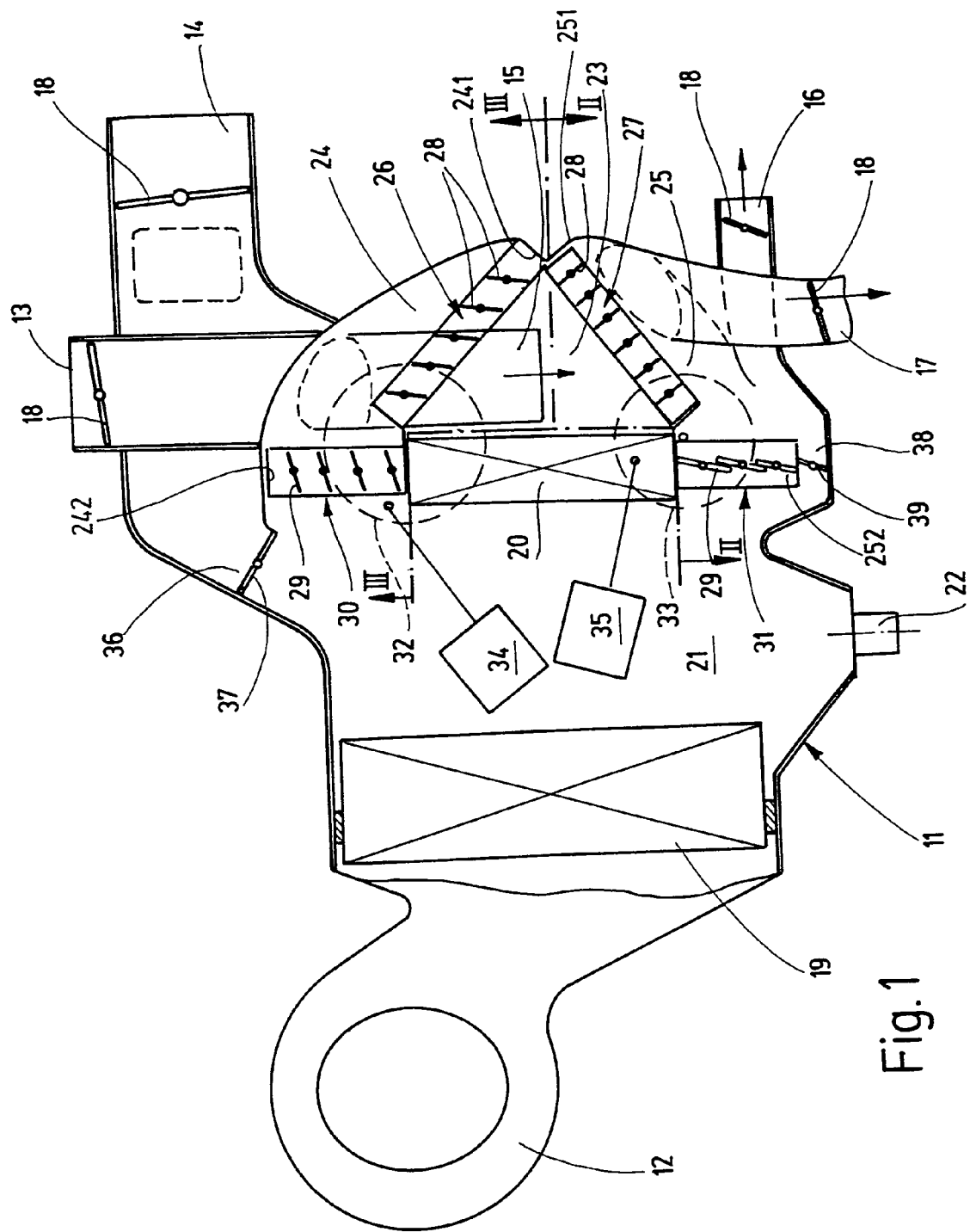
FIG. 1 is a schematic longitudinal sectional view of an air-conditioning box with an attached fan of an air conditioner for an occupant compartment of a passenger car.
Figure 2:
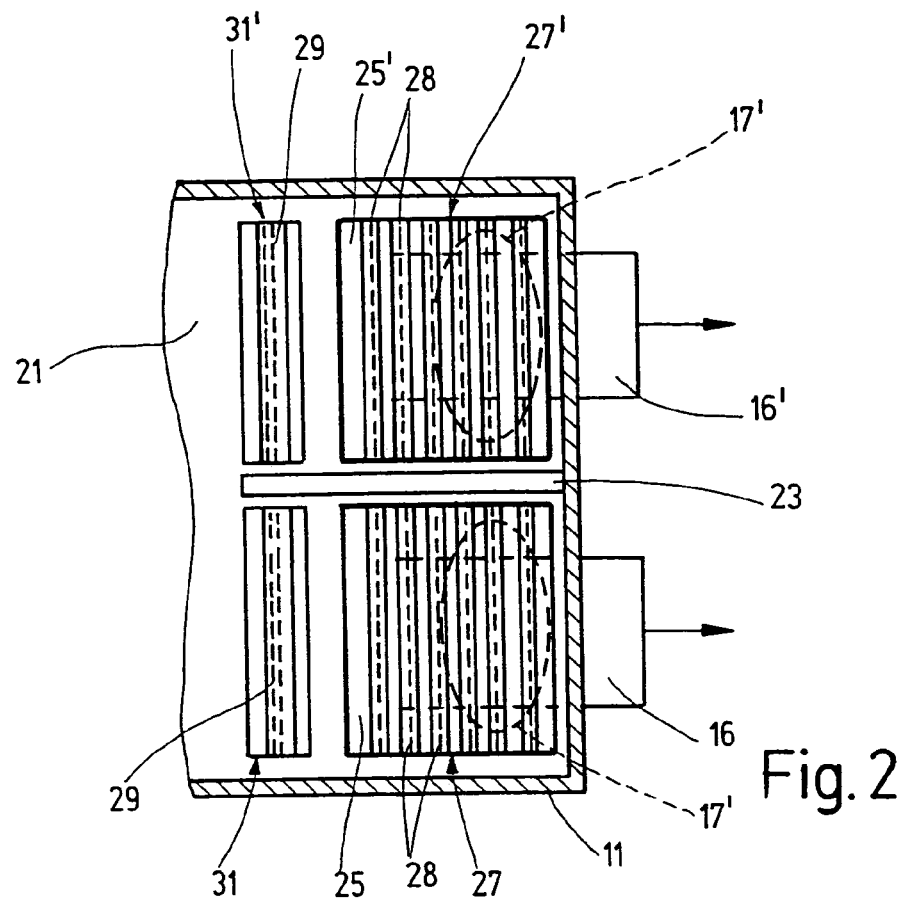
FIG. 2 is a schematic sectional view along line II—II of FIG. 1.
Figure 3:
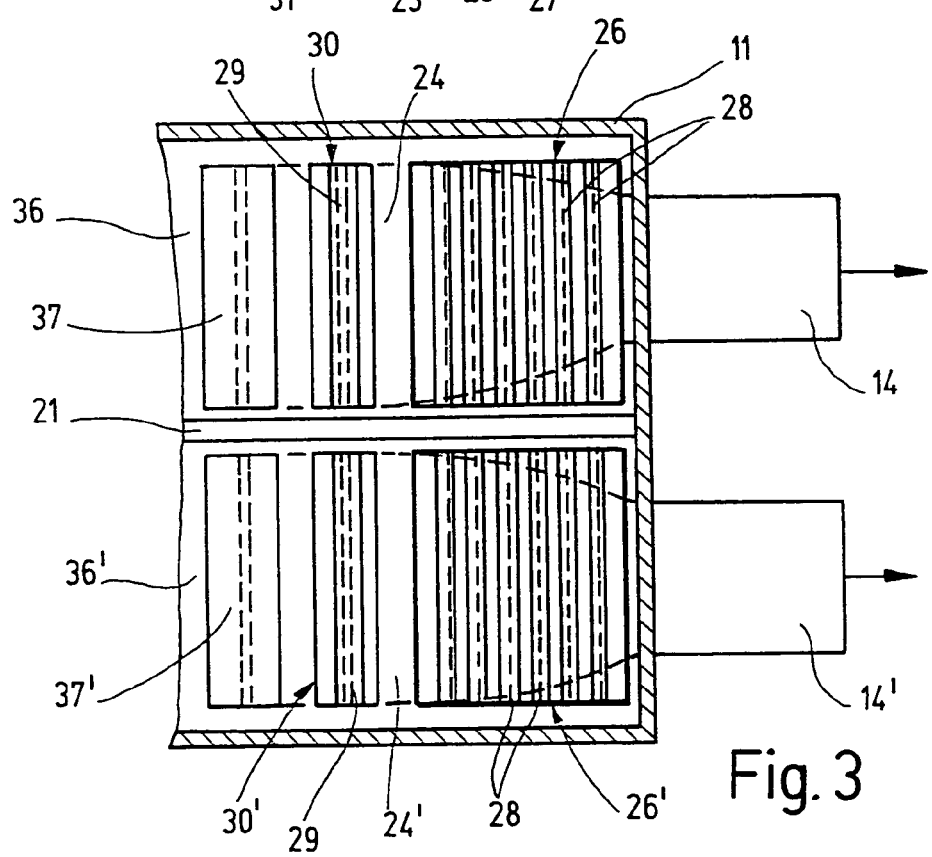
FIG. 3 is a schematic sectional view along line III—III of FIG. 1.

An air conditioner for an occupant compartment of a motor vehicle, particularly a passenger car, has an air-conditioning box 11 represented in a sectional view in FIG. 1, to which a fan 12 is connected on the input side and which, on the output side, has a plurality of air outlet connection pieces for the connection of air outlet openings arranged in a distributed manner in the occupant compartment. For air conditioning of the occupant compartment, this compartment is divided into four seat zones with two seat zones, on the left and right of the occupant center, in the forward vehicle space and with two seat zones, on the left and the right of the occupant center, in the rearward vehicle space. The air outlet openings, which are constructed as nozzles and are connected to the air conditioner, are distributed to the four seat zones in the occupant compartment and are connected to different air outlet connection pieces of the air-conditioning box. First air outlet connection pieces 13 to 17 shown in FIG. 1 exist for the left vehicle half and second air outlet connection pieces exist for the right vehicle half. The air outlet connection piece 13 is intended for connection of defroster nozzles on the left below the windshield in the occupant compartment, the air outlet connection piece 14 is intended for connection of the air outlet nozzles on the left in the center plane of the forward vehicle space of the occupant compartment, the air outlet connection piece 15 is intended for connection of the air outlet nozzles on the left in the leg space of the forward vehicle space of the occupant compartment, the air outlet connection piece 16 is intended for connection of the air outlet nozzles on the left in the center plane of the rearward vehicle space of the occupant compartment, and the air outlet connection piece 17 is intended for connection of the air outlet nozzles on the left in the leg space of the rearward vehicle space of the occupant compartment. The air outlet connection pieces, which are partially visible in FIGS. 2 and 3, are provided with an apostrophe for the same air outlet nozzles in the right vehicle half. Thus, the air outlet connection piece 14' (FIG. 3) leads to the air outlet nozzles on the right of the center plane of the forward vehicle space, and the air outlet connection piece 16' (FIG. 2) leads to the air outlet nozzles on the right of the center plane of the rearward vehicle space. In each air outlet connection piece 13 to 17 and 13' to 17', a swivellably arranged shut-off flap 18 is arranged; this shut-off flap can be operated manually and is used for controlling the air quantity which, in each case, flows out of the individual air outlet nozzles.

Viewed in the air flow direction, an evaporator 19 and a heat exchanger 20 are successively arranged in the air-conditioning box such that their air passage surfaces are aligned parallel to one another and enclose a cold air space 21 between one another. On the floor of the cold air space 21, a water drain 22 is provided for discharging precipitating condensation water. On the back side of the heat exchanger 20 facing away from the cold air space 21, a warm air space 23 is constructed which is adjoined in the upward and downward direction by pairs of air mixing spaces 24 and 24' and 25 and 25', respectively. A seat zone is assigned to each air mixing space 24, 24', 25 and 25' and is used for supplying them with individually air-conditioned air. For this purpose, the air outlet connection pieces 14 and 15 branch off of the air mixing space 24, the air outlet connection pieces 14' and 15' branch off of the air mixing space 24', the air outlet connection pieces 16 and 17 branch off of the air mixing space 25, and the air outlet connection pieces 161 and 17' branch off of the air mixing space 25'. The respective air mixing spaces 24, 24' and 25, 25' form pairs having identical constructions; in the following, only the construction and equipping of the air mixing spaces 24 and 25 will be described. However, the description applies in the same manner to the air mixing spaces 24' and 25', which include components provided with the same reference numbers but which are additionally marked by an apostrophe.

Each of the air mixing spaces 24 and 25 is connected to the warm air space 23 by a warm air inlet 241 or 251. Each warm air inlet 241, 251 is provided with a warm air flap 26, 27, by which the warm air quantity entering from the warm air space 23 into the air mixing space 24, 25 can be adjusted from 0–100%. In the illustrated embodiment, the warm air flaps are constructed as so-called "louver-type" closures including a plurality of individual swivellable lamellae 28 arranged side-by-side. The air mixing space 24 extends above the heat exchanger 20 to the cold air space 21, and the air mixing space 25 for the rearward vehicle space is connected below the heat exchanger 20 to the cold air space 21. Each of the cold air inlets 242 and 252 of the air mixing spaces 24, 25 adjoining the cold air space 21 is equipped with a cold air flap 30, 31. The flaps 30 and 31 are capable of partially to completely blocking and opening-up the cold air inlets 242 and 252 and of taking any intermediate positions between the two extreme adjustments. In the illustrated embodiment, the cold air flaps 30, 31, like the warm air flaps 26, 27, are constructed as louver-type closures including a plurality of individual swivellable lamellae 29 arranged side-by-side. While the planes of the warm air inlets 141, 151 are aligned so as to be sloped at an acute angle with respect to the air passage surfaces of the heat exchanger 20 and the warm air flaps 26, 27 are arranged so that they essentially form the legs of an isosceles triangle, the planes of the cold air inlets 242, 252 are aligned parallel to the air passage surfaces of the heat exchanger 20. As an alternative, it is possible to also align the planes of the cold air inlets 242, 252 at an obtuse angle relative to the air passage surfaces of the heat exchanger 20. The warm air flap 26 and the cold air flap 30, pertaining to the air mixing space 24, and the warm air flap 27 and the cold air flap 31, pertaining to the air mixing space 25, are restrictedly coupled with one another such that one air flap maximally opens up the assigned inlet of the air mixing space 24, 25 when the other air flap completely covers the assigned inlet of the air mixing space 24, 25, and vice versa. The restricted coupling of the warm air flap 26 with the cold air flap 30, and of the warm air flap 27 with the cold air flap 31, is provided as shown in the drawings by control wheels 32 and 33, which are represented by dash-dotted lines and which are operated by respective actuators 34 and 35. The actuators 34, 35 are controlled by a control system, which is not shown here, as a function of the temperature adjustment defined for the seat zones in the forward vehicle space and in the rearward vehicle space of the occupant compartment.

A cold air duct 36 also branches off from the cold air space 21, is equipped with a shut-off flap 37, and leads out into the air outlet connection piece 14 for the left center plane of the forward vehicle space of the occupant compartment. As a result of the more or less wide opening of the shut-off flap 37, the conditioned air flowing from the air mixing space 24 into the left seat zone of the forward vehicle space can be more or less lowered in the center plane with respect to the leg space. This improves the air-conditioned comfort for the front passenger in this seat zone. In the same manner, a cold air duct 38 with a shut-off flap 39 is guided below the cold air inlet 252 for the air mixing space 25. This cold air duct 38 leads into the air outlet connection piece 16 for the left center plane of the rearward vehicle space of the occupant compartment and in the same manner permits lowering of the temperature in the left center plane of the rearward vehicle space with respect to the air also flowing in from the air mixing space 25 by way of the air outlet connection piece 17 into the left leg space of the rearward vehicle space. The same cold air ducts 36' and 38' are provided in the same manner for the right seat zones in the forward vehicle space and in the rearward vehicle space.

Furthermore, the air flaps 26, 27, 30 and 31 of the air mixing spaces 24 and 25, as well as the air flaps 26', 27', 30' and 31' of the two air mixing spaces 24' and 25', may, in each case, be restrictedly coupled with one another so that one actuator, respectively, can be eliminated.

In a simplified construction, the separate air connection pieces 17 and 17' for the leg space of the rearward vehicle space are eliminated so that, in the air mixing spaces 25 and 25' for the rearward vehicle space, only air for the center plane of the rearward vehicle space is tapped by way of the connection pieces 16 and 16'.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Air conditioner for an occupant compartment of a vehicle having a forward vehicle space and a rearward vehicle space with one right seat zone and one left seat zone respectively, the air conditioner comprising:
    an air conditioning box,
    an evaporator arranged in the air conditioning box,
    a heat exchanger arranged in the air conditioning box, a cold air space being situated between the evaporator and the heat exchanger, a warm air space providing a common supply of warm air to the forward vehicle space and rearward vehicle space being arranged behind the heat exchanger, air mixing spaces being controllably connected with the cold and warm air spaces for supplying conditioned air to the forward vehicle space and the rearward vehicle space,
    warm air flaps arranged downstream of the heat exchanger, and
    cold air flaps operatively arranged at upper and lower sides of the heat exchanger,
    wherein four air mixing spaces are provided so that a separate air mixing space is assigned to each seat zone in the forward vehicle space and the rearward vehicle space and for controllably connecting the four air mixing spaces to the cold air space and the warm air space, one of the warm air flaps and one of the cold air flaps each being provided for each of said air mixing spaces wherein the air mixing space of the forward vehicle space and of the rearward vehicle space are selectively communicatable to the warm air space via the warm air flaps, such that a leg space in the forward vehicle space is provided with the conditioned air in a manner not influenced by the conditioned air supplied to a leg space in the rearward vehicle space.

2. Air conditioner according to claim 1, wherein cold air flaps and warm air flaps pertaining to one of the air mixing spaces are restrictedly coupled with one another such that one of the air flaps maximally opens up an inlet of the one of the air mixing spaces when the other of the air flaps completely covers an inlet of the one of the air mixing space assigned to it and vice versa.

3. Air conditioner according to claim 1, wherein the evaporator and the heat exchanger have opposed surfaces aligned approximately parallel to one another, bounding the cold air space on opposite sides, and wherein two controllable cold air inlets of the four air mixing spaces, which can be controlled by the cold air flaps, are respectively arranged above and below the heat exchanger.

4. Air conditioner according to claim 1, wherein selected ones of the warm air inlets of the air mixing spaces, which are controllable by the warm air flaps, are arranged to enclose an acute non-zero angle with an output-side air passage surface of the heat exchanger.

5. Air conditioner according to claim 1, wherein the warm and cold air flaps are louver-type closings.

6. Air conditioner according to claim 1, wherein two of the air mixing spaces are for the forward vehicle space of the occupant compartment, one air duct respectively branches off to left and right outlet openings in the leg space in the forward vehicle space and one air duct respectively branches off to left and right outlet openings in a center plane in a front region of the occupant compartment, and one cold air duct, respectively, a shut-off flap, leads from the cold air space to each of two of the air ducts leading to the center plane in the front region of the occupant compartment.

7. Air conditioner according to claim 1, wherein one air duct leads to each of left and right outlet openings in a center plane in a rear of the occupant compartment and branches off of two of the air mixing spaces for the rearward vehicle space of the occupant compartment, one cold air duct, controllable by a shut-off flap, leads from the cold air space to each air duct which leads to the center plane in the rear.

8. Air conditioner according to claim 1, wherein an air duct, which leads to left and right outlet openings in the leg space of the rearward vehicle space, branches off of each of the air mixing spaces for the rearward vehicle space of the occupant compartment.

9. Air conditioner according to claim 1, wherein the air flaps which pertain to the air mixing spaces for the rearward vehicle space are coupled with the air flaps pertaining to the air mixing spaces for the forward vehicle space.

10. Air conditioner according to claim 2, wherein the evaporator and the heat exchanger have opposed surfaces aligned approximately parallel to one another, bounding the cold air space on opposite sides, and wherein two controllable cold air inlets of the four air mixing spaces, which can be controlled by the cold air flaps, are respectively arranged above and below the heat exchanger.

11. Air conditioner according to claim 10, wherein two of the cold air inlets of the four air mixing spaces, are controllable by the cold air flaps that are situated in a plane of the heat exchanger.

12. Air conditioner according to claim 2, wherein two of the warm air inlets of the four air mixing spaces, are controllable by the warm air flaps and are situated in a plane which encloses an acute non-zero angle with an output-side air passage surface of the heat exchanger.

13. Air conditioner according to claim 4, wherein the warm and cold air flaps are louver-type closings.

14. Air conditioner according to claim 2, wherein two of the air mixing spaces are for the forward vehicle space of the occupant compartment, one air duct respectively branches off to left and right outlet openings in the leg space of the forward vehicle space and one air duct respectively branches off to left and right outlet openings in a center plane in a front region of the occupant compartment, and one cold air duct, respectively, which can be controlled by a shut-off flap, leads from the cold air space to each of two of the air ducts leading to the center plane in the front region of the occupant compartment.

15. Air conditioner according to claim 2, wherein one air duct leads to each of left and right outlet openings in a center plane in a rear of the occupant compartment and branches off of two of the air mixing spaces for the rearward vehicle space of the occupant compartment, one cold air duct, which can be controlled by a shut-off flap, leads from the cold air space to each air duct which leads to the center plane in the rear.

16. Air conditioner according to claim 2, wherein an air duct, which leads to left and right outlet openings in the leg space of the rearward vehicle space, branches off of each of the air mixing spaces for the rearward vehicle space of the occupant compartment.

17. Air conditioner according to claim 2, wherein the air flaps which pertain to the air mixing spaces for the rearward vehicle space are coupled with the air flaps pertaining to the air mixing spaces for the forward vehicle space.

18. Air conditioner according to claim 3, wherein two of the air mixing spaces are for the forward vehicle space of the occupant compartment, one air duct respectively branches off to left and right outlet openings in the leg space of the forward vehicle space and one air duct respectively branches off to left and right outlet openings in a center plane in a front region of the occupant compartment, and one cold air duct, respectively, which can be controlled by a shut-off flap, leads from the cold air space to each of two of the air ducts leading to the center plane in the front region of the occupant compartment.

19. Air conditioner according to claim 3, wherein one air duct leads to each of left and right outlet openings in a center plane in a rear region of the occupant compartment and branches off of two of the air mixing spaces for the rearward vehicle space of the occupant compartment, one cold air duct, which can be controlled by a shut-off flap, leads from the cold air space to each air duct which leads to the center plane in the rear region.

20. Air conditioner for an occupant compartment of a vehicle having a forward vehicle space and a rearward vehicle space with one right seat zone and one left seat zone respectively, the air conditioner comprising:
- an air conditioning box,
- an evaporator arranged in the air conditioning box,
- a heat exchanger arranged in the air conditioning box, a cold air space being situated between the evaporator and the heat exchanger, a warm air space being arranged behind the heat exchanger, air mixing spaces being controllably connected with the cold and warm air spaces for supplying conditioned air to the forward vehicle space and the rearward vehicle space,
- warm air flaps arranged downstream of the heat exchanger, and
- cold air flaps operatively arranged at upper and lower sides of the heat exchanger,
- wherein four air mixing spaces are provided so that a separate air mixing space is assigned to each seat zone in the forward vehicle space and the rearward vehicle space and for controllably connecting the four air mixing spaces to the cold air space and the warm air space, one of the warm air flaps and one of the cold air flaps each being provided for each of said air mixing spaces wherein the air mixing space of the forward vehicle space and of the rearward vehicle space are selectively communicatable to the warm air space via the warm air flaps, such that a leg space in the forward vehicle space is provided with the conditioned air in a manner not influenced by the conditioned air supplied to a leg space in the rearward vehicle space, wherein the evaporator and the heat exchanger have opposed surfaces aligned approximately parallel to one another, bounding the cold air space on opposite sides, and wherein two controllable cold air inlets of the four air mixing spaces, which can be controlled by the cold air flaps, are respectively arranged above and below the heat exchanger, and
- two of the cold air inlets of the four air mixing spaces are controllable by the cold air flaps that are situated in a plane of the heat exchanger.

* * * * *